(12) United States Patent
Ngu et al.

(10) Patent No.: US 10,197,730 B1
(45) Date of Patent: Feb. 5, 2019

(54) OPTICAL THROUGH SILICON VIA

(71) Applicant: GLOBALFOUNDRIES INC., Grand Cayman (KY)

(72) Inventors: Yves T. Ngu, Williston, VT (US); Vibhor Jain, Essex Junction, VT (US); John J. Ellis-Monaghan, Grand Isle, VT (US); Sebastian Theodore Ventrone, South Burlington, VT (US); Saurabh Sirohi, South Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/806,931

(22) Filed: Nov. 8, 2017

(51) Int. Cl.
*G02B 6/12* (2006.01)
*G02B 6/293* (2006.01)
*G02F 1/01* (2006.01)
*G02F 1/025* (2006.01)

(52) U.S. Cl.
CPC ..... *G02B 6/12002* (2013.01); *G02B 6/29338* (2013.01); *G02B 6/29395* (2013.01); *G02F 1/0147* (2013.01); *G02F 1/025* (2013.01); *G02B 2006/12069* (2013.01)

(58) Field of Classification Search
CPC ............ G02B 6/29341; G02B 6/29343; G02B 6/29335; G02B 6/29338
See application file for complete search history.

(56) References Cited

U.S. PATENT DOCUMENTS

| | | | |
|---|---|---|---|
| 6,968,110 B2 | 11/2005 | Patel et al. | |
| 6,996,305 B2* | 2/2006 | Kim | G02B 6/43 385/14 |
| 7,352,066 B2* | 4/2008 | Budd | G02B 6/43 257/13 |
| 8,399,292 B2 | 3/2013 | Doany et al. | |
| 8,541,884 B2* | 9/2013 | Conn | H01L 23/5384 257/621 |
| 9,219,347 B2* | 12/2015 | Akiyama | H01S 5/1071 |
| 9,496,447 B2 | 11/2016 | Leobandung et al. | |
| 9,606,291 B2* | 3/2017 | Ellis-Monaghan | G02B 6/1228 |
| 9,740,080 B2* | 8/2017 | Ellis-Monaghan | G02F 1/3137 |
| 9,829,635 B2* | 11/2017 | Tu | G02B 6/29341 |

(Continued)

OTHER PUBLICATIONS

Schumann et al., "Hybrid 2D-3D optical devices for integrated optics by direct laser writing", Light: Science & Applications (2014) 3, e175, 2014, 9 pages.

(Continued)

*Primary Examiner* — Rhonda S Peace
(74) *Attorney, Agent, or Firm* — Anthony Canale; Andrew M. Calderon; Roberts Mlotkowski Safran Cole & Calderon, P.C.

(57) ABSTRACT

The present disclosure relates to semiconductor structures and, more particularly, to optical via connections in chip-to-chip transmission in a 3D chip stack structure using an optical via, and methods of manufacture. The structure has a first wafer, including a first waveguide coupled to an optical resonator in the first wafer, and a second wafer, including a second waveguide, located over the first wafer. The structure also includes an optical via extending between the optical resonator of the first wafer and the second waveguide of the second wafer to optically couple the first and second waveguides.

17 Claims, 6 Drawing Sheets

(56) References Cited

U.S. PATENT DOCUMENTS

| | | | |
|---|---|---|---|
| 9,904,009 B2* | 2/2018 | Leobandung | G02B 6/12002 |
| 2016/0116672 A1 | 4/2016 | Leobandung | |
| 2016/0377806 A1* | 12/2016 | Ellis-Monaghan | G02B 6/125 |
| | | | 385/14 |
| 2017/0017039 A1* | 1/2017 | Tu | G02B 6/12007 |
| 2017/0102563 A1* | 4/2017 | Luo | G02F 1/025 |

OTHER PUBLICATIONS

Parekh et al, "Electrical, Optical and Fluidic Through-Silicon Vias for Silicon Interposer Applications" Georgia Institute of Technology, 2011 Electronic Components and Technology Conference, 7 pages.

* cited by examiner

US 10,197,730 B1

OPTICAL THROUGH SILICON VIA

FIELD OF THE INVENTION

The present disclosure relates to semiconductor structures and, more particularly, to optical via connections in chip-to-chip transmission in a 3D chip stack structure using an optical via, and methods of manufacture.

BACKGROUND

Optical fibers have been used to transmit optical signals between chips. In such systems, optical interfaces have been provided on each of the chips to optically couple the optical fiber to optical waveguides on the respective chips. This allows electrical signals on the respective chips to be converted into optical signals and then transmitted between the chips on the optical fiber. The optical interfaces can be diffraction gratings or silicon optical metamaterials, for example. However, these optical interfaces tend to be quite lossy, leading to inefficiencies in the optical connections between the chips.

Other structures have used dielectric optical waveguides for optical transmission between chips. In these arrangements, optical transceivers are used for directly transmitting the light to dielectric optical waveguides. In conjunction with this, PIN detectors can be placed above the dielectric optical waveguides. However, such dielectric optical waveguides are highly lossy, again creating significant inefficiencies in the data transmission.

SUMMARY

In an aspect of the disclosure, a structure having a first wafer including a first waveguide coupled to an optical resonator in the first wafer, and a second wafer, including a second waveguide, located over the first wafer. The structure also includes an optical via extending between the optical resonator of the first wafer and the second waveguide of the second wafer to optically couple the first and second waveguides.

In an aspect of the disclosure, a system having a first wafer includes photonics, a first waveguide and a ring resonator, and a second wafer includes a second waveguide. An optical via extends from the optical resonator of the first wafer and through an opening in the second wafer. The optical via is filled with an optically transmissive material and with a transparent electrically conductive material along a sidewall of the via, wherein the transparent electrically conductive material contacts an upper surface of the optical resonator and extends to a location adjacent a side surface of the second waveguide.

In an aspect of the disclosure, a method comprises forming an optical via between a first wafer having a optical resonator and a second wafer having an optical waveguide to optically couple the optical resonator of the first wafer with the optical waveguide of the second wafer.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1A:
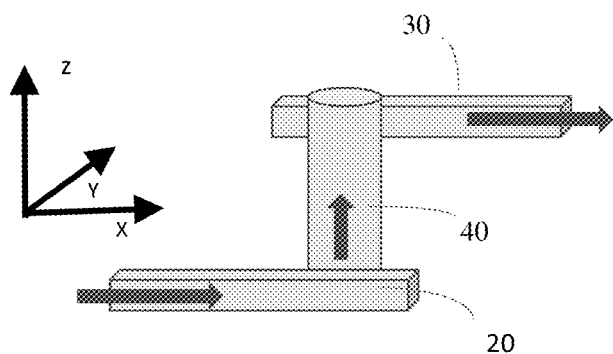
FIG. 1A shows a perspective view of optical via structure with coupling optical signals between waveguides in different chips in accordance with aspects of the present disclosure.

The present disclosure relates to semiconductor structures and, more particularly, to optical via connections in chip-to-chip transmission in a 3D chip stack structure using an optical via, and methods of manufacture. In embodiments, the structures described herein include a transparent optical via that allows chip to chip light transmission in a 3D stack. By implementing the optical vias disclosed herein, it is now possible to provide improvements in cross chip bandwidth of data transmission with the ability to transmit data through a chip stack structure. Advantageously, the structures described herein also provide optical transmission through the wafer in a much faster and lower power in-chip communication, 3D integration scheme, compared to conventional structures.

In embodiments, the optical vias are an integrated optical through-silicon-via in a 3D chip stack arranged to provide lateral coupling of light from a ring resonator of the first wafer to the waveguide of the second wafer, or vice versa. The structures include a first wafer with a silicon waveguide coupled to a ring resonator. A second wafer with a silicon waveguide is coupled to an optical via through the thickness of the second wafer. The optical via is optically coupled to (e.g., touches) the ring resonator on the first wafer. In embodiments, the integrated optical via between two or more wafers in a 3D chip stack permits communication between the wafers without the need for an interposer layer.

The optical via can be a cylindrical via that includes conductive layers which form a p-n diode or a p-i-n diode.

The diodes can provide wavelength tunability for the optical via by biasing the pn junction of the diode. Alternatively, the optical via can be composed of polysilicon in which wavelength tunability is achieved by thermal heating of the film. The diode can be a hollow cylinder filled with dielectric and conductive layers or a solid silicon cylinder formed of conductive layers of the diode.

In embodiments, the coupling direction for optical coupling between the wafers in the chip stack can be bidirectional, e.g., from the ring resonator of the first wafer to the waveguide of the second wafer, or vice versa. Further, a selected wavelength for the optical coupling through the optical via can be provided via junction biasing of the diode formed by conductive layers in the optical via. The optical coupling can also be turned on and off based on the junction biasing of the diode in the optical via. In embodiments, thermal heating of a polysilicon layer in the optical via can control the selected wavelength or turning the optical coupling on and off. If desired, a control system with feedback can be provided for biasing of the diode junctions, or thermal control of a polysilicon layer in the optical via. Control systems with feedback can also be used to maintain tuning for the waveguides in the wafers to account for changes in thermal and/or ambient conditions.

The optical via connections of the present disclosure can be manufactured in a number of ways using a number of different tools. In general, though, the methodologies and tools are used to form structures with dimensions in the micrometer and nanometer scale. The methodologies, i.e., technologies, employed to manufacture the optical via connections of the present disclosure have been adopted from integrated circuit (IC) technology. For example, the structures are built on wafers and are realized in films of material patterned by photolithographic processes on the top of a wafer. In particular, the fabrication of the optical via connections uses three basic building blocks: (i) deposition of thin films of material on a substrate, (ii) applying a patterned mask on top of the films by photolithographic imaging, and (iii) etching the films selectively to the mask.

Figure 1B:
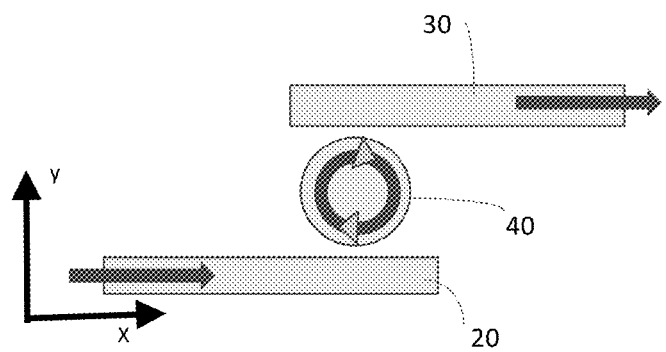
FIG. 1B shows a top view of the optical via structure of FIG. 1A.

FIG. 1A is a perspective view showing a schematic of an optical via in accordance with aspects of the present disclosure. FIG. 1B is a top view of the structure of FIG. 1A. Referring to FIGS. 1A and 1B, a first waveguide 20 is formed adjacent to a ring resonator (see, e.g., FIG. 2A) formed in an optical via 40. The use of a ring resonator permits coupling of an optical signal in the first waveguide 20 to a second waveguide 30, or vice versa, by ring coupling through the optical via 40. The first waveguide 20 can be formed as a buried waveguide in a first wafer of a 3D chip stack, while the second waveguide 30 can be formed as a buried waveguide in a second wafer of the 3D chip stack, as will be shown in greater detail in subsequent figures.

By implementing the structures herein, light signals can travel through the linear waveguides 20, 30 in different wafers of a 3D chip stack by ring coupling through the optical via 40. This provides for optical transmission between waveguides of different chips in a manner which is much less lossy than conventional techniques. Although the optical via 40 is shown with a circular cross-section, other shapes are also contemplated herein. Also, although only two stacked wafers are shown in the examples provided herein, additional wafers, each having waveguides, could be connected by the optical via, or the optical via could connect waveguides in subsets of multiple stacked wafers.

Although the waveguides 20, 30 could be coupled directly to the optical via 40, preferably each of these waveguides is spaced apart from the optical via 40 to avoid scattering which tends to be caused if the waveguides directly contact the materials in the optical via 40. For example, the waveguide 20 can be spaced from a ring resonator of the optical via 40 within a range of 0.1 µm-0.5 µm to permit satisfactory coupling without scattering. As will be discussed in greater detail herein, the waveguide 30 is also preferably spaced from conductive materials in the optical via 40 within a range of 0.1 µm-0.5 µm to permit satisfactory coupling without scattering. Preferably, as will be discussed in greater detail herein, the optical via 40 is filled with transparent optically conductive material, e.g., doped polysilicon, although different transparent materials could be used, including dielectric insulators and undoped polysilicon or other semiconductor materials, either doped or undoped.

Figure 2A:
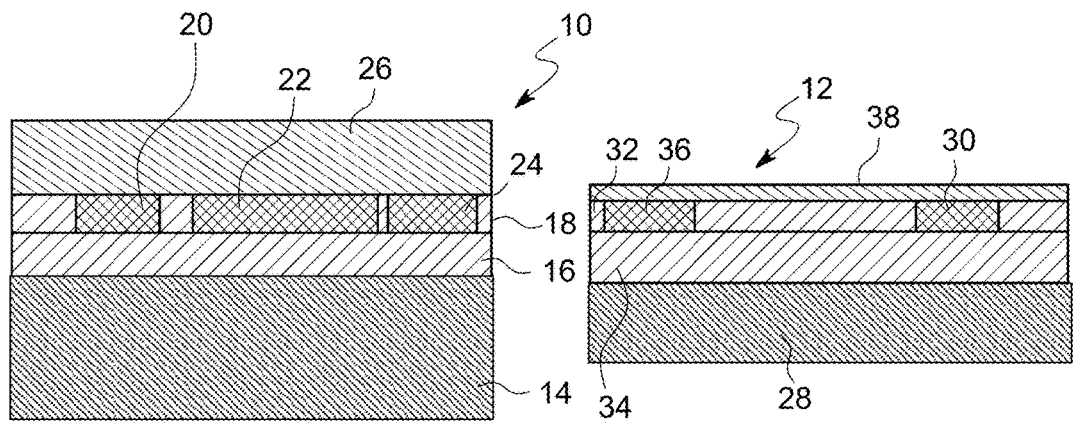
FIG. 2A shows a cross-sectional view of first and second wafers prior to stacking, and respective fabrication processes in accordance with aspects of the present disclosure.

FIG. 2A shows a cross-sectional view of a structure and respective fabrication processes in accordance with aspects of the present disclosure. More specifically, FIG. 2A shows a first wafer 10 and a second wafer 12 prior to the wafers 10 and 12 being stacked (bonded) on one another to form a 3D chip stack structure. It is noted that although the wafers 10, 12 can be SOI wafers, bulk wafer technology is also contemplated herein. If bulk wafers are used, deep trench STI would be provided under the waveguides.

Referring still to FIG. 2A, the wafer 10 includes a handle wafer 14, a buried oxide (BOX) layer 16 formed on the handle wafer 14, and a substrate 18 formed on the BOX layer 16. The substrate 18 includes a waveguide 20, an optical resonator 22, and one or more CMOS devices 24. The substrate 18, waveguide 20, the resonator 22 and CMOS devices 24, are covered with a dielectric layer 26, e.g., oxide material. The optical resonator 22 serves as part of a ring resonator. The second wafer 12 includes a handle wafer 28, a BOX layer 34 formed on the handle wafer 28, and a substrate 32 formed on the second BOX layer 34. The substrate 32 includes a waveguide 30, one or more CMOS devices 36, and a dielectric layer 38 formed over an upper surface of the substrate 32, including over upper surfaces of the waveguide 30 in the CMOS device 36.

In embodiments, the handle wafers 14, 26 can be Si mandrels bonded to the substrates 18, 32 via an oxide-oxide bond. In alternative embodiments, the handle wafers 14, 26 can be attached to the substrates 18, 32 by an adhesive or an organic glue, as examples known to those of skill in the art such that further explanation is not required for an understanding of the processes described herein. The dielectric layers 26, 38 can, for example, be oxide/nitride layers, borophosphosilicate glass (BPSG) or any dielectric material suitable for insulating the upper surface of the substrate 18, 32 and the waveguide 20, 30 contained therein. The substrates 18, 32 can be any suitable semiconductor material, for example, Si; although other substrates are contemplated herein, e.g., SiGe, etc.

In addition, the CMOS devices 24, 36 can include any active or passive devices formed using conventional CMOS processes. For example, the CMOS devices 24, 36 can include logic devices, analog devices, processors, resistors, capacitors, etc., or other front end of the line (FEOL) or back end of the line (BEOL) structures/devices. It is noted that although only CMOS devices 24, 36 are shown in the substrates 18, 32, respectively, other devices could be formed in the substrates, including photonics and BiCMOS devices. It is further noted that digital subsystems can be included as part of the CMOS devices 24, 36 to provide control signals for selection of a wavelength of interest for the waveguides, 30 so that the preferred wavelength can be passed between the waveguides via the resonator 22 and the optical via 40, as discussed previously with regard to FIGS. 1A and 1B.

Figure 2B:
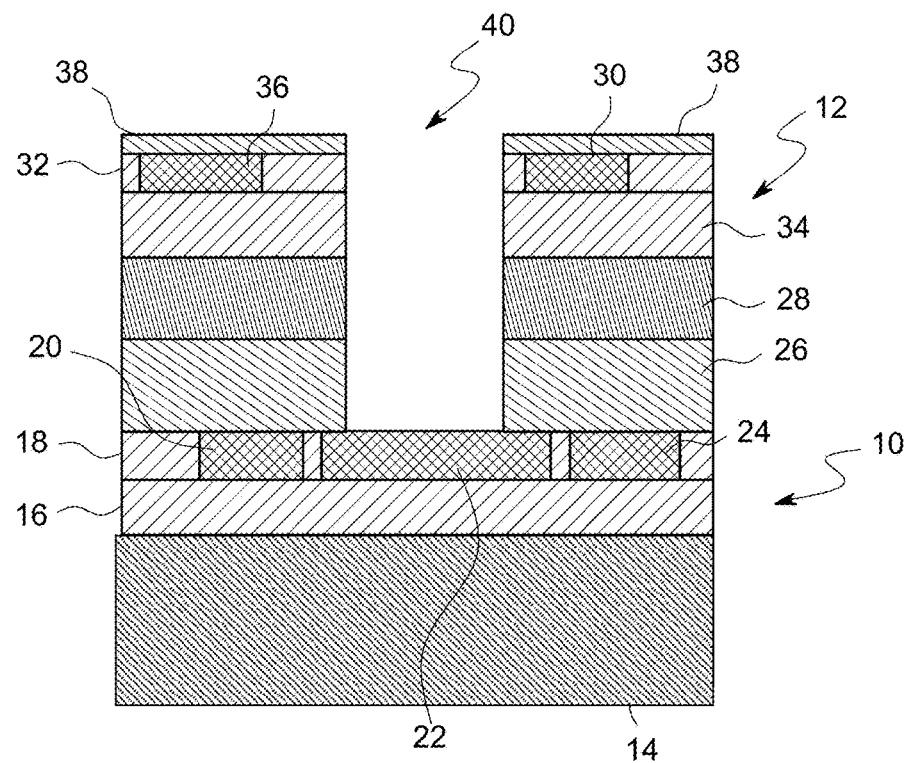
FIG. 2B shows a cross-sectional view of the stacked wafers of FIG. 2A with an optical via provided between the stacked wafers, and respective fabrication processes in accordance with aspects of the present disclosure.

Referring to FIG. 2B, the wafer 10 and wafer 12 are stacked on one another such that the handle wafer 28 of the wafer 12 is bonded to an upper surface of the dielectric layer 26 of the wafer 10. This bonding can be accomplished with adhesive or other bonding techniques. Regarding this, both wafers 10, 12 are aligned with one another in accordance with well-known 3D stacking techniques. For purposes of example, the handle wafers 14, 28 are relatively thin, for example, 50 µm, although the thickness could be in a range between 50 µm-750 µm. Particularly in the case of the handle wafer 28, using the thickness of 50 µm makes it easier to form the optical via 40, and also helps to minimize the length of the optical via to facilitate communication between the waveguides 20, 30.

Still referring to FIG. 2B, an optical via 40 is formed to extend completely through the layers of the wafer 12 and the dielectric layer 26 of the SOI wafer 10, landing on the upper surface of the resonator 22. In embodiments, the optical via 40 can also land on the dielectric layer 26 above the resonator 22, if the material of the dielectric layer 26 is transparent. In either scenario, optical coupling can take place between the resonator 22 and the transparent materials which will be filled into the optical via 40. In embodiments, the optical via 40 is preferably an annular shaped via, although other shapes are also contemplated herein (e.g., cylindrical).

In embodiments, the optical via 40 can be fabricated using conventional lithography, etching and deposition steps in accordance with well-known CMOS processes. For example, a resist formed over the dielectric layer 38 can be exposed to energy (e.g., light) to form one or more openings (e.g., patterns). An etching process, e.g., reactive ion etching (RIE), can be performed through the openings, with a chemistry selective to the underlying materials. The resist is then removed using conventional stripants, e.g., oxygen ashing. Following the etching process, materials can be deposited within the optical via 40 using conventional deposition processes, e.g., chemical vapor deposition (CVD).

Figure 2C:
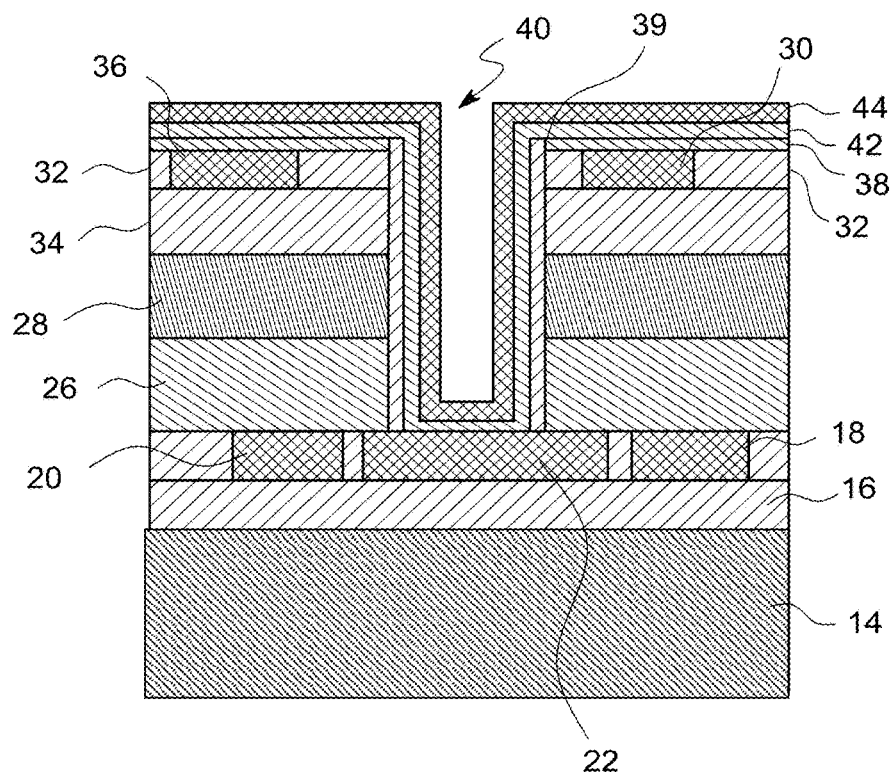
FIG. 2C shows a cross-sectional view showing the optical via filled with conductive material, and respective fabrication processes, in accordance with aspects of the present disclosure.

In FIG. 2C, a sidewall liner 39 is deposited on sidewalls of the optical via 40 using, e.g., CVD process. In embodiments, the liner 39 is an oxide material, although other insulative materials are contemplated herein. The liner 39 is blanket deposited, followed by an anisotropic etching process to remove the material from horizontal surfaces, e.g., bottom of the optical via 40 and upper portions of the dielectric layer 38. The thickness of the sidewall liner 39 depends on whether lateral coupling will be provided between transparent conductive materials in the optical via 40 and a sidewall of the waveguide 30, or whether vertical coupling will be provided to an upper surface of the optical waveguide 30.

In the case of lateral coupling, for example, the sidewall liner 39 should be transparent and relatively thin, at least at an upper portion adjacent to a side surface of the waveguide 30, for example, 0.1 µm-0.5 µm, so that light from the optical via can be transferred through the sidewall liner 39 to a side surface of the waveguide 30. In the case of vertical coupling, for example, the sidewall liner 39 should be thicker, for example, 2 µm-4 µm, to prevent light from transferring between the optical via 40 and a side surface of the waveguide 30 since, in this case, coupling is intended for an upper surface of the waveguide 30. Also, in the case of vertical coupling, the sidewall liner 39 can be transparent, although it is also possible to use a sidewall liner which is not transparent.

Next, electrically conductive layers 42, 44 are respectively deposited over the sidewall liner 39, the upper surface of the resonator 22, upper surfaces of the dielectric layer 38 and the waveguide 30 of the wafer 12. The deposition of these materials can be performed by conventional deposition methods, e.g., CVD. As shown in FIG. 2C, the first conductive layer 42 is separated from an upper surface of the waveguide 30 by the dielectric layer 38. It is noted that the embodiment shown in FIG. 2C is intended for vertical coupling of light from the conductive layer 42 to an upper surface of the waveguide 30 through the optically transparent dielectric layer 38. In order to facilitate this, the dielectric layer 38 be relatively thin, preferably in a range of 0.1 µm-0.5 µm, to facilitate optical communication between the first conductive layer 42 and the upper surface of the second optical waveguide 30, although other thicknesses are contemplated herein. Also, conductive layers 42, 44 can be about 0.5 µm thick, although other thicknesses are possible as long as proper diode operation can be achieved using the PN junction between the conductive layers 42 and 44, as will be discussed herein.

In embodiments, the first conductive layer 42 and the second conductive layer 44 are not only electrically conductive but also optically conductive, preferably transparent. For example, the first conductive layer 42 can be formed of p-type polycrystalline silicon material, while the second conductive layer 42 can be formed of n-type polycrystalline silicon material, or vice versa. In embodiments, it is preferable that the conductive layers 42, 44 be of opposite conductivity types to provide a PN junction between these layers to allow biasing that will control wavelengths of light which pass through the optical via 40. It is also noted that although these layers 42, 44 are described as being formed of polycrystalline silicon, other transparent materials which are optically and electrically conductive, and which can create a PN junction between them, are contemplated herein.

Figure 2D:
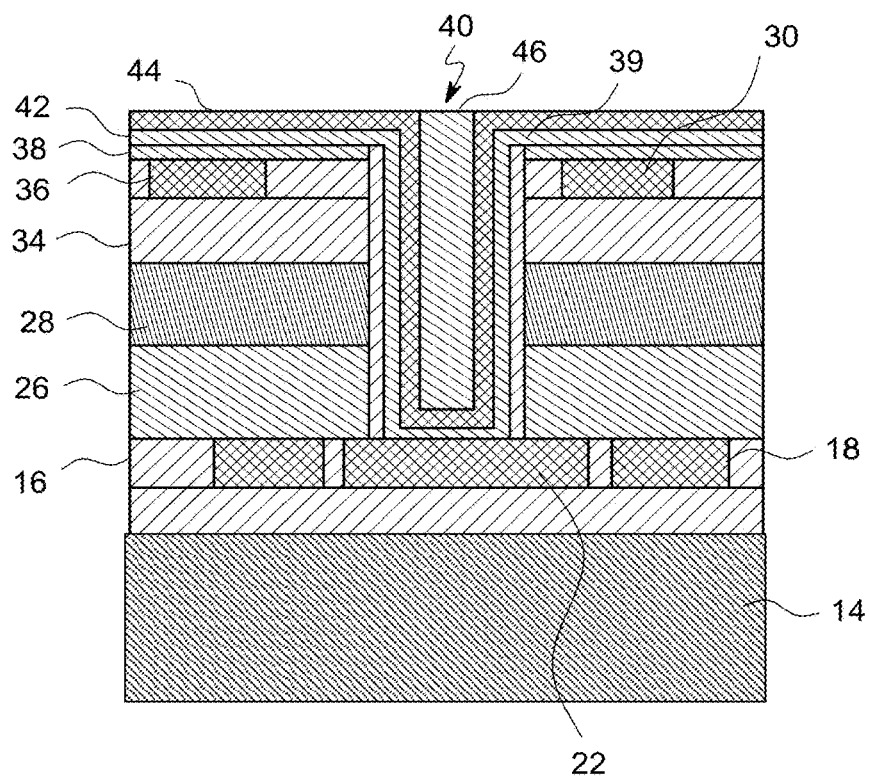
FIG. 2D shows a cross-sectional view showing the optical via filled with oxide material, and respective fabrication processes in accordance with aspects of the present disclosure.

Referring to FIG. 2D, the remaining portion of the optical via 40 is filled with a transparent oxide fill material 46 or another suitable transparent dielectric material. Following this, the oxide fill material 46 is polished to ensure a planar upper surface for the application of additional layers. The deposition of the oxide fill material 46 can be performed using a conventional CVD deposition process, and the polishing of the upper surfaces of the oxide fill material 46 can be performed with conventional CMP polishing.

Figure 2E:
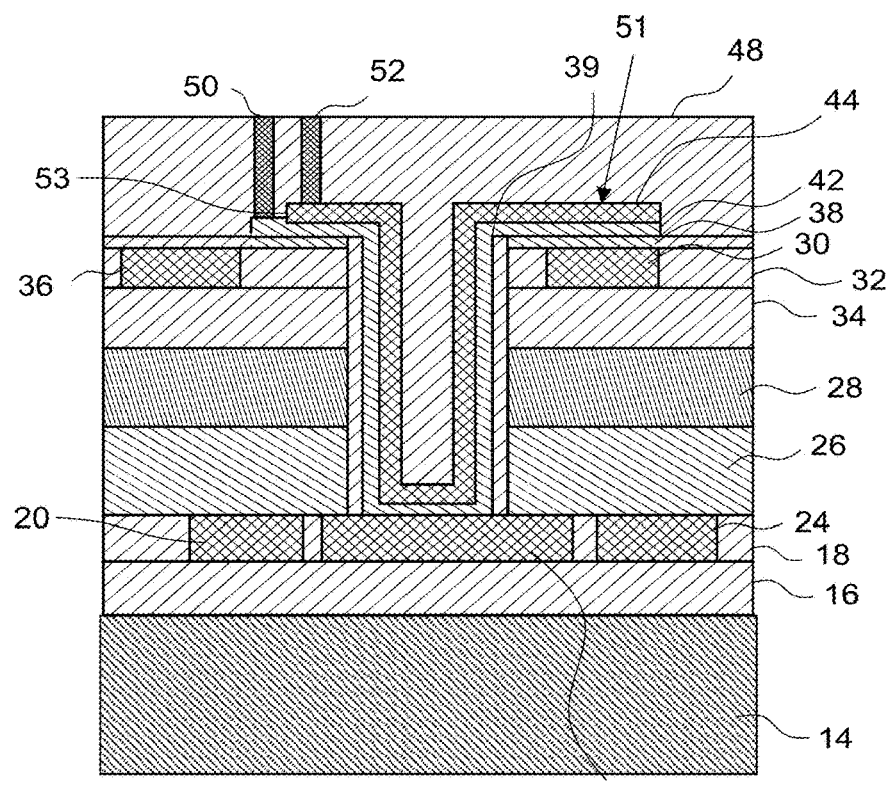
FIG. 2E shows a cross-sectional view showing the formation of contacts on the conductive layers in the optical via to form a final structure of an embodiment, and respective fabrication processes, in accordance with aspects of the present disclosure.

In FIG. 2E, the dielectric layer 38 and layers 42, 44 are patterned to form a tab portion 51 over the waveguide structure 32. In addition, the layers 42, 44 are further patterned to form a stepped configuration 53 so that electrically conductive contact 50, 52 can be formed in electrical contact to each of the layers 42, 44. In embodiments, the dielectric layer 38 and layers 42, 44 are patterned using conventional lithography and etching processes as already described herein.

An oxide layer 48 is formed over the upper surface of the oxide fill 46 and patterned conductive layers 42, 44. The oxide layer 48 can be deposited by a conventional oxide deposition process, such as CVD, followed by a polishing step using, e.g., CMP polishing process. Alternatively, the oxide layer 48 could be formed as a BPSG oxide, but, in this case, care should be taken to avoid damage to previously formed layers since the temperature for forming a BPSG oxide is higher than that using a conventional CVD oxide deposition process. In any case, as shown in FIG. 2E, after polishing of the upper surface of the oxide layer 48, lithography, etching and deposition processes are performed to form an electrically conductive contact 50 for the P-type polysilicon conductive layer 42 and an electrically conductive contact 52 for the N-type polysilicon conductive layer 44. The material of the electrically conductive contacts 50, 52 can be copper, for example.

By way of example, in the completed embodiment shown in FIG. 2E, a total diameter of the optical via 40 can be about 18 µm, with the thickness of the sidewall liner 39 being between 2 µm-4 µm, and the thickness of the conductive layers 42, 44 being about 0.5 µm, although other diameters and thicknesses could be used to obtain satisfactory transmission of the optical signals through the optical via 40. As noted earlier, the embodiment shown in FIG. 2E includes a tab 51 of the conductive layers 42, 44 extending over the upper surfaces of the dielectric layer 38 and the waveguide 30, an optical signal can travel in the following path: (i) waveguide 20 to (ii) resonator 22 to (iii) optical via 40 to (iv) tab 51 over the waveguide 30 and into (v) the waveguide 30. In this way, the waveguide 20 from one wafer can be optically coupled to a waveguide 30 of another wafer. As discussed, to facilitate this optical communication, a thickness of the dielectric layer 38 can be preferably set in a range of 0.1 µm-0.5 µm, although other thicknesses could be used as long as satisfactory optical coupling can be provided through the transparent dielectric layer 38.

Providing the conductive layers 42, 44 in the optical via 40, rather than completely filling the via with dielectric material, provides several advantages. For example, the structure shown in FIG. 2E provides a PN junction diode structure formed by a PN junction created between the first P-type conductive layer 42 and the second N-type conductive layer 44. By applying electrical bias signals to the electrical contacts 50 and 52, the PN junction formed between the conductive layers 42 and 44 can be biased to allow tuning for optimum wavelengths for the optical signals generated by the resonator 22 to pass through the optical via 40 as part of the combined ring resonator operation of the resonator 22 in the optical via 40. In other words, by providing the conductive layers 42, 44 in the optical via 40, it is possible to select wavelengths of the optical signals which will be allowed to pass between the waveguides 20 and 30 through the optical via 40. It is also possible to turn the transmission of the optical signals between the waveguides 20 and 30 on and off based on the electrical biasing of the PN junction between the conductive layers 42 and 44.

It is noted that the transmission of the optical signals through the optical via 40 can be bidirectional. It is further noted that the wavelength control achieved by biasing the PN junction of the conductive layers 42 and 44 can be performed regardless of whether the optical signals are being transmitted from the first waveguide 22 the second waveguide 30 or from the second waveguide 30 to the first waveguide 20.

As noted previously, each of the substrates 18, 32 can include photonics as well as CMOS logic or BiCMOS logic. The CMOS or BiCMOS logic can include control circuitry for controlling the electrical bias applied to the PN junction of the conductive layers 42, 44 through the respective electrical contacts 50, 52. Alternatively, external control circuitry can be provided for biasing the PN junction. Further, the control circuitry can include control systems with feedback to change the bias on the PN junction, for example, due to changes in temperature and/or ambient conditions. In this way, optimum tuning of the wavelengths passing between the waveguides 20 and 30 through the optical resonator 22 and the optical via 40 can be obtained using the PN junction created between the conductive layers 42, 44.

It is further noted that the photonics on the wafers 18, 32 can include an integrated light source to provide the necessary light for creation of the optical signal from electrical signals being processed by the CMOS or BiCMOS logic circuitry. Alternatively, an external light source can be provided. It is further noted that although FIG. 2E shows an arrangement using a PN junction between conductive layers 42, 44, it is also possible to use a PIN diode structure by interposing an intrinsic layer between the conductive layers 42, 44, which PIN diode structure is also capable of performing the biasing to tune the wavelength of the optical signals passing through the optical via 40, as discussed above.

Figure 3:
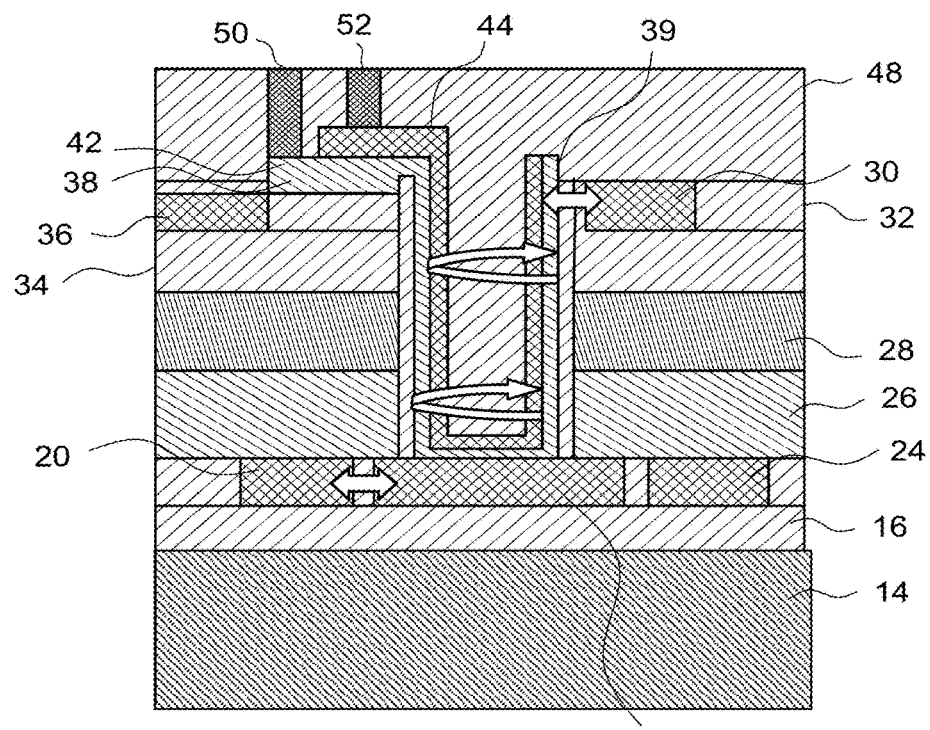
FIG. 3 shows a cross-sectional view of an optical via connection, and respective fabrication processes, in accordance with additional aspects of the present disclosure.

FIG. 3 shows another embodiment in accordance with the present disclosure, and respective fabrication processes. In FIG. 3, like numerals refer to like elements of FIGS. 2A-2E. FIG. 3 differs from FIG. 2E in that the tab of the conductive layers 42, 44 is etched off (removed) prior to the deposition of the oxide layer 48. In conjunction with this, as discussed earlier, the sidewall liner 39 is thinner than in the embodiment shown in FIG. 2E, at least in the portion adjacent to the side surface of the waveguide 30, so that light can be laterally coupled from the optical via 40 to a side surface of the waveguide 30 through the thin sidewall liner 39. Preferably, the sidewall liner 39 can be formed in a range of 0.1 µm-0.5 µm for optimal coupling, although other thicknesses could be used as long as satisfactory optical coupling is achieved between the electrically and optically conductive layers 42 and 44 and a side surface of the second waveguide 30.

Figure 4:
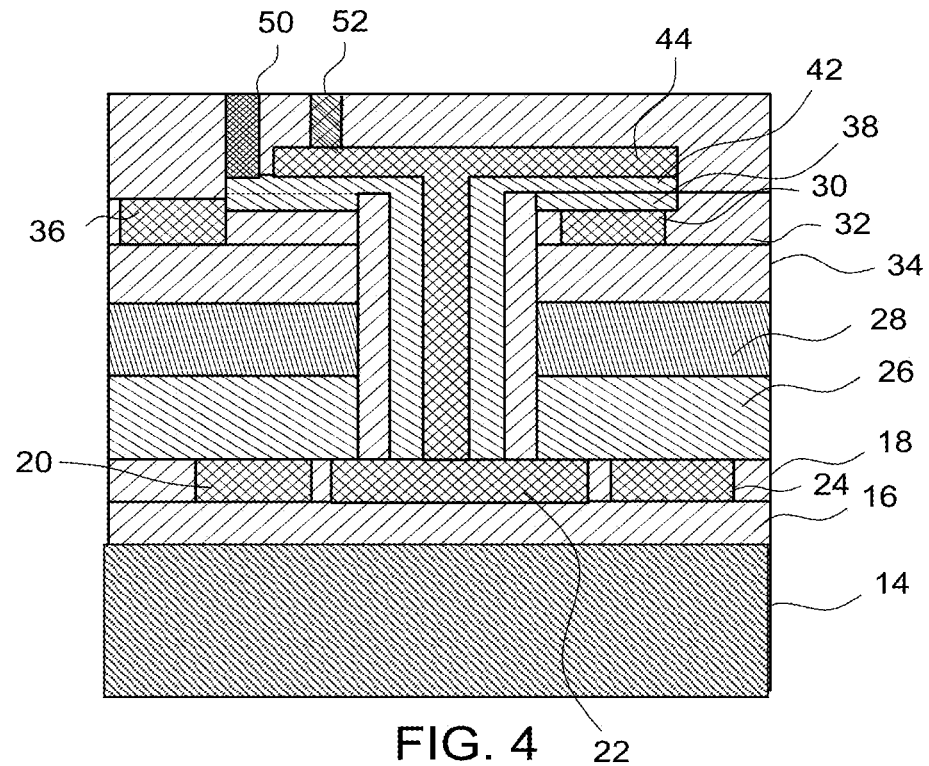
FIG. 4 shows a cross-sectional view of an optical via connection, and respective fabrication processes, in accordance with additional aspects of the present disclosure.

Referring to next to FIG. 4, another embodiment in accordance with the present disclosure is shown. In FIG. 4, like numerals refer to like elements of FIGS. 2A-2E. FIG. 4 differs from the embodiment shown in FIG. 2E in that the entire optical via between the sidewall liner 39 is filled with intrinsic poly material, e.g., polycrystalline silicon layers, rather than a combination of polycrystalline silicon layers and dielectric material. In particular, as shown in FIG. 4, the optical via 40 between the sidewall liner 39 is filled with the conductive layers 42, 44. As shown in FIG. 4, the conductive layers 42, 44 can extend completely through the optical via 40 into contact with an upper surface of the resonator 22. Alternatively, an intrinsic polycrystalline layer (not shown) can be provided between the conductive layers 42 and 44 to provide a p-i-n junction, or a gradient.

Inasmuch as the optical via 40 in this embodiment does not include a dielectric fill material in a central portion, the outer diameter of the optical via 40 can be reduced, for example, to about 10 µm, compared with the embodiment shown in FIG. 2E. In conjunction with this, the sidewall liner 39 can have a thickness of about 2 µm-4 µm, while the conductive layers 42, 44 can each be formed to be relatively thick compared with the embodiment FIG. 2E, for example, 0.5 µm-3 µm thick. Again, it is noted that other thicknesses for the conductive layers 42 and 44 could be used, as long as proper electrical biasing of the PN junction between these two layers can be achieved to obtain optimum wavelengths for transmission of optical signals through the optical via 40.

Figure 5:
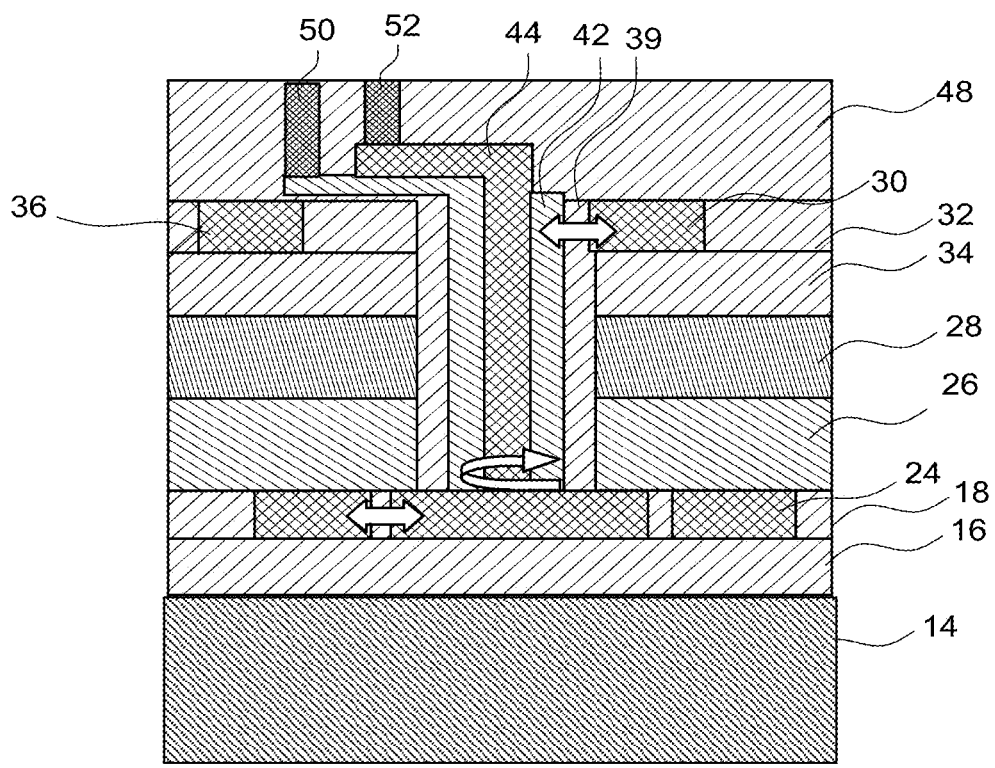
FIG. 5 shows a cross-sectional view of an optical via connection, and respective fabrication processes, in accordance with additional aspects of the present disclosure.

Referring to FIG. 5, another embodiment in accordance with the present disclosure, and respective fabrication processes, is shown. In FIG. 5, like numerals refer to like elements of the previous figures. In FIG. 5, similar to the embodiment shown in FIG. 4, the optical via 40 is completely filled with the conductive polycrystalline silicon layers 42, 44 between the sidewall liner 39. However, in FIG. 5, similar to the embodiment shown in FIG. 3, the tab of the conductive layers 42, 44 which extends over the upper surface of the optical waveguide 30 is etched (removed) prior to the deposition of the oxide layer 48.

Further, similar to the embodiment discussed with regard to FIG. 3, the thickness of the sidewall liner 39 is reduced, at least in the upper area adjacent to the sidewall of the waveguide 30, to facilitate optical coupling between the conductive layers 42 and 44 and the sidewall of the waveguide 30 through the thin portion of the sidewall liner 39. As discussed previously, providing a thickness for the sidewall liner 39 in a range of 0.1 μm-0.5 μm facilitates this optical coupling through the transparent sidewall liner 39, although other thicknesses could be used as long as satisfactory optical coupling can be achieved. It is noted that the sidewall liner 39 only needs to be thinned in the upper portion adjacent to the sidewall of the optical waveguide 30, and could be thicker in a lower region, for example, 2 μm-4 μm, which would avoid light leakage in lower portions of the optical via 40.

Figure 6:
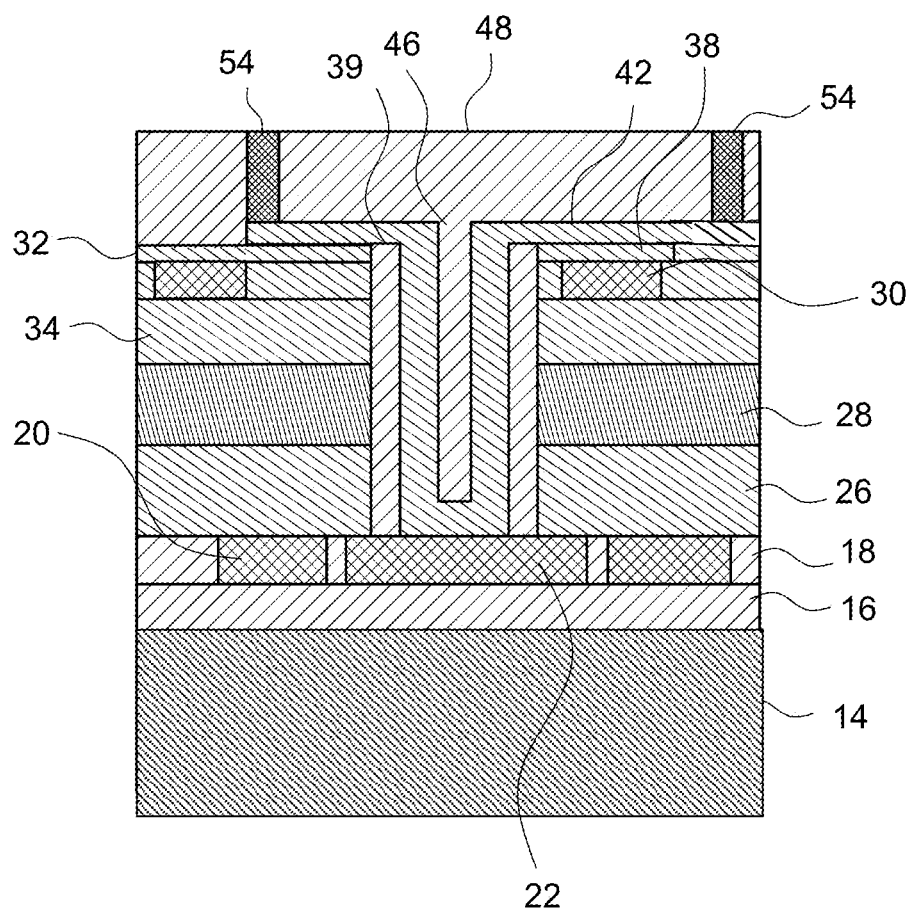
FIG. 6 shows a cross-sectional view of an optical via connection, and respective fabrication processes, in accordance with additional aspects of the present disclosure.

FIG. 6 shows another embodiment in accordance with the present disclosure. In FIG. 6, like numerals refer to like elements of the previous figures. The embodiment shown in FIG. 6 differs from the previously described embodiments inasmuch as it does not use biasing of a PN junction between conductive layers of opposite conductivity type to achieve wavelength tunability of the optical signal traveling through the optical via 40. Instead, wavelength tunability is achieved by heating the optical via 40.

In the arrangement shown in FIG. 6, the heating process is obtained using a pair of electrical contacts 54, located on opposite sides of the optical via 40, to pass current through a polycrystalline silicon layer 42. In this case, the polycrystalline silicon layer 42 can be doped using conventional processes to be either P-type or N-type. Alternatively, the polycrystalline silicon layer 42 can be undoped, intrinsic polycrystalline silicon. In any case, by applying electrical current to layer 42 and layer 32, heat is generated by the resistance of the layers thereby heating the optical via 40 and the resonator 22. As the temperature of the optical via 40 and the resonator 20 increases, the number of carriers in the optical via will increase, thereby changing the wavelength of resonance in the resonator 22 and the optical via 40. Generally satisfactory wavelength tunability can be achieved by heating the optical via to a temperature as high as 200° C., although the actual temperature depends upon the desired wavelength for optimum transmission through the optical via 40.

Although the embodiment shown in FIG. 6 shows a pair of electrical contacts 54 on opposite sides of the optical via 40, the contacts can be placed on the same side of the optical via 40, if desired. This alternative embodiment can be particularly useful if the tab of the conductive layer 42 extending over the upper surface of the waveguide 30 is removed.

Figure 7:
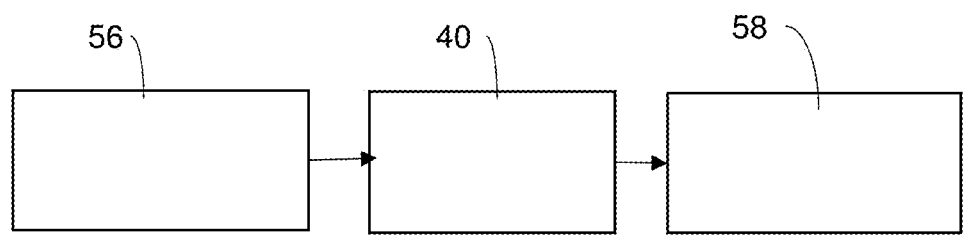
FIG. 7 shows a system view of the operation of the optical via in accordance with aspects of the present disclosure.

FIG. 7 shows a system view of providing control signals for the selection of wavelengths passing through the optical via 40, in accordance with aspects of the present disclosure. As shown in FIG. 7, a digital subsystem 56 can be provided, for example, in the CMOS device 24 of the first substrate 18, to provide control signals for initiating and tuning the resonator 22 (see FIG. 2E) to a desired wavelength for optimal transmission through the optical via 40. On the receiving end, for example, at the optical waveguide 30 and the second substrate 32, a receiving circuit 58 is provided, for example, by the CMOS device 36 of the second substrate 32, for digital conversion of the light signals received by the second waveguide 30, to allow re-creation of the data pattern provided by the CMOS logic 20 of the first substrate 18.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
a first wafer including a first waveguide coupled to an optical resonator in the first wafer;
a second wafer, including a second waveguide, located over the first wafer; and
an optical via extending between the optical resonator of the first wafer and the second waveguide of the second wafer to optically couple the first and second waveguides,
wherein the optical resonator and the optical via form a ring resonator,
the optical via includes silicon to optically couple the optical resonator of the first wafer to the second waveguide of the second wafer, and
the optical via is filled with a polysilicon film structure to tune a wavelength of optical signal passing through the optical via by thermal heating of the polysilicon film.

2. The structure of claim 1, wherein the optical via is a cylindrical via and includes transparent layers and a transparent dielectric fill.

3. The structure of claim 2, wherein the first and second waveguides are linear silicon waveguides.

4. The structure of claim 1, wherein the optical via contacts an upper surface of the optical resonator which faces the second waveguide.

5. The structure of claim 4, wherein the first waveguide is spaced apart from the optical resonator by 0.1-0.5 μm in the first wafer.

6. The structure of claim 1, wherein the optical via includes at least one of a PN diode and a PIN diode structured to tune a wavelength of an optical signal passing through the optical via by biasing a junction of the diode.

7. The structure of claim 1, wherein the optical via is filled with a conductive material to couple light from the optical resonator of the first wafer laterally to a sidewall of the second waveguide of the second wafer through a sidewall of the optical via.

8. The structure of claim 7, wherein the sidewall of the optical via has a thickness of 0.1-0.5 µm at a location adjacent to the sidewall of the second waveguide.

9. The structure of claim 1, wherein the optical via is filled with a conductive material which extends over an upper surface of the second waveguide to vertically couple light from the optical resonator to the upper surface of the second waveguide through an insulator formed over the upper surface of the second waveguide.

10. The structure of claim 9, wherein the insulator has a thickness of 0.1-0.5 µm.

11. A system comprising:
a first wafer includes photonics, a first waveguide and an optical resonator;
a second wafer including a second waveguide; and
an optical via extending from the optical resonator of the first wafer and through an opening in the second wafer,
wherein the optical via is filled with an optically transmissive material and with a transparent electrically conductive material along a sidewall of the via, wherein the transparent electrically conductive material contacts an upper surface of the optical resonator and extends to a location adjacent a side surface of the second waveguide, and
the transparent electrically conductive material comprises a first polysilicon layer having a first conductivity type and a second polysilicon layer formed over the first polysilicon layer and having a second conductivity type.

12. The system of claim 11, wherein the optical via further includes an insulating material formed on a sidewall of the via and separating the first and second polysilicon layers from the second waveguide, and the first and second polysilicon layers extend over an upper surface of the second waveguide.

13. The system of claim 12, wherein the first and second polysilicon layers are configured to receive a bias voltage to control light flow through the via between the ring resonator first wafer and the second waveguide of the second wafer.

14. The system of claim 13, further comprising a control system to control the bias voltage applied to the first and second polysilicon layers based on changes in thermal and/or ambient conditions.

15. A method comprising:
forming an optical via between a first wafer having an optical resonator and a second wafer having an optical waveguide to optically couple the optical resonator of the first wafer with the optical waveguide of the second wafer; and
forming an insulator over an upper surface of the optical waveguide,
wherein the optical via is filled with a conductive material which extends over the upper surface of the optical waveguide to vertically couple light from the optical resonator to the upper surface of the optical waveguide through the insulator formed over the upper surface of the optical waveguide.

16. The method of claim 15, wherein the conductive material extends through the optical via to be adjacent to a sidewall of the optical waveguide of the second wafer.

17. The method of claim 16, further comprising controlling a wavelength of an optical signal passing through the optical via by applying a bias voltage to the conductive material.

* * * * *